(12) United States Patent
Oh et al.

(10) Patent No.: US 9,798,785 B2
(45) Date of Patent: Oct. 24, 2017

(54) APPARATUS AND METHOD FOR SEARCHING FOR ADDRESS BOOK INFORMATION

(75) Inventors: Gyu-Bong Oh, Suwon-si (KR); Sun-Gi Gu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 539 days.

(21) Appl. No.: 13/978,826

(22) PCT Filed: Jan. 20, 2012

(86) PCT No.: PCT/KR2012/000563
§ 371 (c)(1),
(2), (4) Date: Jul. 9, 2013

(87) PCT Pub. No.: WO2012/102537
PCT Pub. Date: Aug. 2, 2012

(65) Prior Publication Data
US 2013/0282700 A1    Oct. 24, 2013

(30) Foreign Application Priority Data
Jan. 24, 2011    (KR) ........................ 10-2011-0006960

(51) Int. Cl.
*G06F 17/30*    (2006.01)
(52) U.S. Cl.
CPC .. *G06F 17/30554* (2013.01); *G06F 17/30979* (2013.01); *Y02B 60/188* (2013.01)
(58) Field of Classification Search
CPC ......... G06F 17/30554; G06F 17/30864; G06F 17/30867; G06F 17/30991

USPC ........................................................ 707/722
See application file for complete search history.

(56) References Cited

U.S. PATENT DOCUMENTS

| | | | |
|---|---|---|---|
| 8,375,025 B1* | 2/2013 | Datar .................. | G06F 17/3053 707/706 |
| 2004/0002972 A1* | 1/2004 | Pather .................... | G06F 9/542 |
| 2004/0024751 A1* | 2/2004 | Petrisor ............ | G06F 17/30867 |
| 2004/0122812 A1 | 6/2004 | Yoshimura et al. | |
| 2006/0004711 A1* | 1/2006 | Naam ............... | G06F 17/30867 |
| 2006/0253421 A1* | 11/2006 | Chen ................. | G06F 17/30964 |
| 2007/0016570 A1* | 1/2007 | Punaganti Venkata ............ | G06F 17/30864 |
| 2007/0265828 A1* | 11/2007 | Lorraine Scott ...... | G06F 17/289 704/9 |

(Continued)

FOREIGN PATENT DOCUMENTS

| | | |
|---|---|---|
| JP | 2004-199515 A | 7/2004 |
| KR | 10-2006-0048718 A | 5/2006 |
| WO | 01/67297 A1 | 9/2001 |

*Primary Examiner* — Hosain Alam
*Assistant Examiner* — Robert F May
(74) *Attorney, Agent, or Firm* — Jefferson IP Law, LLP

(57) ABSTRACT

Provided is an apparatus and method for searching for address book information. To this end, the present invention, upon receiving a search request message for searching address book information from a client, checks a search preference, searches for the address book information based on the checked search preference, applies a priority to the found address book information to create a final search result, creates a response message including the created final search result, forwards the response message to the client, and updates the preset search preference based on the final search result, thereby providing a search result optimized for a user.

25 Claims, 3 Drawing Sheets

(56) References Cited

U.S. PATENT DOCUMENTS

2009/0106202 A1* 4/2009 Mizrahi ............ G06F 17/30887
2010/0198854 A1* 8/2010 Chitturi ............ G06F 17/30864
  707/760
2010/0325201 A1* 12/2010 Chitturi ................ H04L 67/125
  709/203
2011/0173223 A1* 7/2011 Chitturi ................ G06Q 10/107
  707/769

* cited by examiner

APPARATUS AND METHOD FOR SEARCHING FOR ADDRESS BOOK INFORMATION

CROSS-REFERENCE TO RELATED APPLICATION(S)

This application is a National Stage application under 35 U.S.C. §371 of an International application filed on Jan. 20, 2012 and assigned application No. PCT/KR2012/000563 which claims the benefit under 35 U.S.C. §365(b) of a Korean patent application filed on Jan. 24, 2011 in the Korean Intellectual Property Office and assigned Serial No. 10-2011-0006960, the entire disclosure of which is hereby incorporated by reference.

TECHNICAL FIELD

The present invention generally relates to an apparatus and method for optimizing a search, and more particularly, to an apparatus and method for optimizing a search for address book information by using a search preference.

BACKGROUND ART

A general Converged Address Book (CAB) service is provided to improve user experience and activity in association with an address book by storing a single network address book in a network.

The CAB conceptually consists of a CAB client, a CAB server, and a CAB XML Document Management Server (XDMS). The CAB XDMS includes a CAB Address Book (AB) application (app.) usage, a CAB personal contact card app. usage, a CAB user preference app. usage, and a CAB feature handler app. usage.

The CAB client communicates with the CAB server on a terminal, performs CAB user authentication and synchronization between contact information (i.e., a Personal Contact Card (PCC)) and an aggregated address book stored in a network repository, and sends CAB user's demands, such as address subscription, address search, address share, interaction with an existing address book, management of user preferences, or the like to the CAB server.

The CAB server, a main network component in a CAB structure, receives the CAB user's demands from the CAB client, and processes the received CAB user's demands. Main features of the CAB server include CAB client mutual authentication, CAB address storage, address information synchronization, and reflection of address information updates from an address subscription feature into an address book. The CAB server is a network component which performs address subscription/share/translation and reflects user preferences/policies. The CAB server has an address subscription feature of retrieving a CAB user preference XML document from a CAB user preference repository and receiving a CAB user's subscription request, an address share feature of applying personal preferences to data received through address subscription and reflecting the data into an address book, maintaining subscription state information, and sharing the PCC or the aggregated address book, and an interworking feature of interworking with an existing address book system or exposing an interface to an external enabler.

An XDM server which manages user's data in association with the CAB enabler includes an AB app. usage, a CAB user preference app. usage for managing user preferences, a CAB feature handler app. usage for managing CAB service request/response, and a PCC app. usage for storing PCC information.

In addition, an XDMC for connecting to various app. usage functions, a SIP/IP core network for message routing with entities of an external domain, a PUSH enabler for delivering notification messages of non-SIP terminals, and so forth may be provided.

The CAB service may include the following main features:

1. Address Book Synchronization

A. Once a CAB user modifies a local address book in a terminal, a CAB client sends modified information to a CAB server by using a CAB-1 (SyncML) interface.

B. An Address Book (AB) synchronization function module in the CAB server reflects modified data in an AB app. usage in an XML Document Management (XDM) server by using an XDM agent. If the CAB client and the AB app. usage have different formats, conversion occurs, resulting in a data loss due to conversion between the different formats.

2. Contact Subscription

A. The CAB client sends an XML Configuration Access Protocol (XCAP) request for contact subscription to a CAB user preference app. usage.

B. The CAB user preference app. usage adds a reception contact address from the XCAP request to a contact subscription list.

C. The CAB user preference app. usage informs a contact subscription function in the CAB server of a document change of the contact subscription list.

D. The contact subscription function sends a contact subscription request associated with a reception side's PCC from the contact subscription list to a reception side's domain directly or via a subscription proxy.

E. A reception side's PCC app. usage having received the contact subscription request checks an access permission and a user preference and informs the reception side of a subscription result.

F. The CAB client may execute address subscription according to an XDM Document Command Protocol (XDCP) by using a subscribe and push enabler in an environment where SIP is not supported.

3. Contact Share

A. The CAB client sends an XML Configuration Access Protocol (XCAP) request for contact share to a CAB feature handler app. usage.

B. The CAB feature handler app. usage adds a reception contact address and a preference of share data from the XCAP request to a CAB feature handler.

C. The CAB feature handler app. usage informs a contact share function in the CAB server of a document change of the CAB feature handler.

D. The contact share function recognizes a contact status from the AB app. usage based on a reception side's address.

i. If the reception side is a CAB user, the contact share function creates the contact share request and then sends the created contact share request to the AB app. usage or the PCC app. usage in the XDM server by using the XDM agent. The corresponding app. usage sends the share data to the reception side based on an XDM forward mechanism.

ii. If the reception side is not a CAB user, the contact share function receives data from the AB app. usage or PCC app. usage in the XDM server for forwarding, requests the CAB interworking function to perform format conversion into a legacy format, and then sends the data to the reception side through a messaging enabler.

4. Contact Search

A. The CAB client sends a contact search request associated with its AB or PCC an AB or PCC of a different domain through an aggregation proxy/search proxy of an XDM enabler.

B. The contact search request is routed to the corresponding app. usage by the search proxy, and the corresponding app. usage sends back a search result to the CAB client.

C. The CAB client translates the contact search request into an external search request through the interworking function during an external directory search, translates an external search result received through the interworking function into a standard XML search result, and then sends the standard XML search result to the CAB client.

5. Retrieval of External Address Book from Non-CAB System

A. The CAB client sends an XML Configuration Access Protocol (XCAP) request for importing non-CAB data to the CAB feature handler app. usage.

B. The CAB feature handler app. usage adds a non-CAB source, a credential, and a scheduled interval from the XCAP request to the CAB feature handler.

C. The CAB feature handler app. usage informs the interworking function in the CAB server of a document change of the CAB feature handler.

D. The interworking function obtains information about non-CAB address book data to store the obtained information in an AB application storing unit according to the CAB user preference, and informs the CAB client to start address book synchronization.

Meanwhile, when an address book or a PCC of the same domain or a different domain is searched, the CAB client forwards the search request message for searching the address book or PCC to the CAB AB app. usage or the CAB PCC app. usage in the CAB XDM server through a network.

The CAB AB app. usage or the CAB PCC app. usage having received the search request message forwards a response to the received search request message to the CAB client through the network.

When an external directory, such as a directory of a common carrier, is searched, the CAB client forwards a search request message for searching the external directory to the CAB server through the network.

The CAB server having received the search request message forwards the search request message to external directories, and receives response messages thereto from the external directories.

Thereafter, the CAB server forwards the response messages to the search request message to the CAB client.

DISCLOSURE OF INVENTION

Technical Problem

As such, conventionally, the CAB server forwards all the found information to a requesting side, such that a large number of unrefined search results are provided to a user. If the maximum number of search results is limited, the number of search results may be significantly reduced.

In addition, conventionally, if excessively many search results are obtained, the user has to input additional information a number of times and search for desired information again to obtain the desired information.

Moreover, a large number of search results have to be provided to a terminal and a network, leading to a large amount of resource consumption.

Solution to Problem

Accordingly, the present invention provides an apparatus and method for setting a user's search preference and providing an optimal search result in a CAB system.

According to an aspect of the present invention, there is provided a method for searching for address book information by an apparatus for searching for address book information. The method includes, upon receiving search request messages for searching for address book information in at least one external directories from a plurality of requesting clients, checking search preferences corresponding to the plurality of requesting clients in a database, creating external search request messages corresponding to the at least one external directories associated with the search request messages based on the checked search preferences, forwarding the external search request messages to the at least one external directories, upon receiving external search results from the at least one external directories, applying the search preferences to the received external search results to create final search results, forwarding the created final search results to the plurality of requesting clients, and updating the search preferences based on the final search results.

According to another aspect of the present invention, there is provided an apparatus for searching for address book information, the apparatus including a database and a server. The database stores search preferences corresponding to a plurality of requesting clients. The server, upon receiving search request messages for searching for address book information in at least one external directories from a plurality of requesting clients, checks search preferences corresponding to the plurality of requesting clients in a database, creates external search request messages corresponding to the at least one external directories associated with the search request messages based on the checked search preferences, forwards the external search request messages to the at least one external directories, upon receiving external search results from the at least one external directories, applies the search preferences to the received external search results to create final search results, forwards the created final search results to the plurality of requesting clients, and updates the search preferences based on the final search results. The database updates the search preferences based on the final search results.

Advantageous Effects of Invention

As such, the present invention previously sets the user's search preference and searches for address book information according to the set search preference, thereby providing the search result optimized for the user.

BEST MODE FOR CARRYING OUT THE INVENTION

Figure 1:
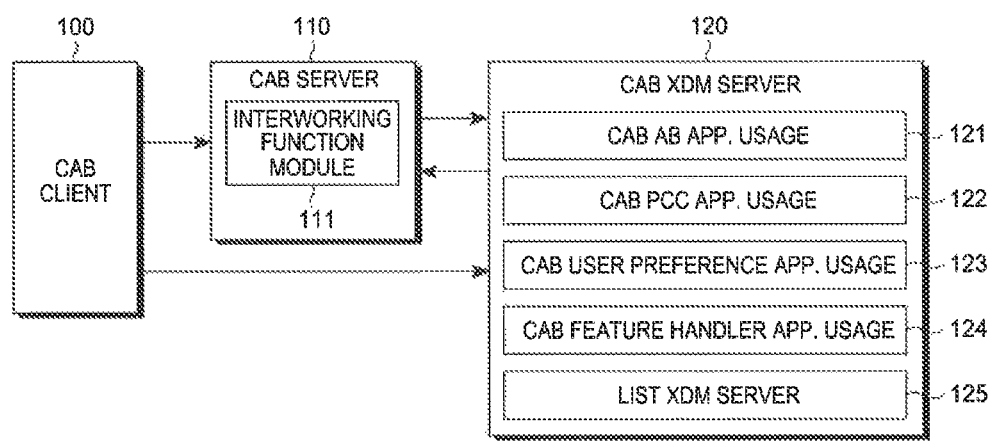
FIG. 1 is a block diagram of a CAB system according to an embodiment of the present invention.

Hereinafter, an exemplary embodiment of the present invention will be described in detail with reference to the accompanying drawings. In the following description, a detailed description of known functions or configurations incorporated herein will be omitted when it may unnecessarily obscure the subject matter of the present invention.

In the present invention, search preferences for an optimal search result are stored in a CAB user preference application (app.) usage, and all or some of them are applied to a search request, a search result, and a search preference, thereby providing an optimized search result to a user.

More specifically, once a CAB user transmits a search request message including an attribute <optimized_search> for optimizing a search during a contact (or address) search to a CAB XDM server, then a CAB client requests a search from the CAB XDM server or an external directory by referring to a search preference in a CAB user preference app. usage for an optimized search of the corresponding app. usage or the external directory.

Thereafter, the CAB XDM server applies a priority to the search result according to the search preference and updates the search preference according to accumulated search results, thus providing an optimized search result for the user.

Prior to the contact search, the user may previously store the search preference in a CAB user preference app. storing unit. Herein, the following information may be used as the search preference.

1. <srch_request> in Contact Search Request
A. Application or non-application of the search preference to the contact search request.
B. Application or non-application of the search preference to a preferred external search domain (<preferred external search domain>)
B.1 A preferred external search domain (e.g., www.twitter.com, www.facebook.com, etc.) and a preference weight value per domain
C. Application or non-application of the search preference for dynamic search (<dynamic_srch>) according to a user's location.
C.1 User's location information, user's time-zone information, etc. (e.g., <location>, <time-zone>, etc.)

2. <srch_response> in Search Result
A. Application or non-application of the search preference to the search result
B. Application or non-application of a prioritized preference (<prioritized_matching>) to the search result
B.1 A detailed preference for prioritization of the search result (e.g., user's language, country, region, etc., <language>, <country>, <region>, etc.) and a weight value therefor Although search optimization through application of location information to both the search request and the search response may be considered, use of country and region information which do not correspond to the user's current residing location as the prioritized search preference may lead to a wrong search result and thus should be avoided.

C. Filter for Filtering of the Search Result
3. Search preference which can be directly managed (created/modified/deleted) by the user and can also be updated by the CAB XDM server according to accumulated search requests/results (<dynamic search preference update>).
4. In addition, a necessary preference element or attribute may also be included for user preference extension.

<Table 1> shows an example of the search preference.

TABLE 1

```
<?xml version="1.0" encoding="UTF-8"?>
<cab-upp-set xmlns:ocp="urn:oma:xml:cab:user-prefs"
        <xmlns:xsi="http://www.w3.org/2001/XMLSchema-instance">
    <profile id="abc123">
        <auto-synchronize-ab> true   </auto-synchronize-ab>
        <send-notification-contact-added>false </send-notification-contact-added>
        <receive-notification-when-contact-added>true</receive-notification-when-contact-added>
        <notify-when-contact-becomes-cab-user>true</notify-when-contact-becomes-cab-user>
        <notify-when-receive-contact-subscription>true</notify-when-receive-contact-subscription>
        <notify-on-contact-subscription-update>true   </notify-on-contact-subscription-update>
        <update-ab>true</update-ab>
        <enable-ab-record>true</enable-ab-record>
        <!?search preference for optimization/prioritization -->
        <optimized_search>
            <srch_request status="true">
            <!--apply to search request for external directories with the preference value -->
            <preferred_external_search_domain status="true">
                <entry_url pref="1"> "www.twitter.com" </entry_url>
                <entry_url pref="5"> "www.facebook.com" </entry_url>
            </preferred external_search_domain>
            <!?dynamic search by using personal location information -->
            <dynamic srch status="false"
                <location>true</location>
                <time-zone>true</time-zone>
            </dynamic_srch>
            </srch_request>
            <srch_response status="time">
            <!--prioritization preference with the preference value-->
            <prioritized_matching status="true">
                <language pref="1"> Korean </language>
                <country pref="10"> KR </country>
                <region> Seoul </region>
            </prioritized_matching>
            <!?apply to search response for filtering the search result -->
            <filter id-"123">
                <what>
                <exclude>
```

TABLE 1-continued

```
                /external-directories/external-directory/contact[language="Chinese"]
            </exclude>
            </what>
        </filter>
        </srch_response>
        <dynamic_search_preference_update> true </dynamic search_preference_update>
        </optimized_search>
    </profile>
</cab-upp-set>
```

By using the search preference shown in Table 1, an address book or a PCC of the same domain or a different domain is searched or address information in an external directory may be searched.

FIG. 1 is a block diagram of a CAB system according to an embodiment of the present invention.

Referring to FIG. 1, the CAB system may include a CAB client 100, a CAB server 110, and a CAB XDM server 120.

The CAB client 100 creates a search request message for a search, and transmits the created search request message to a CAB network 200.

The search request message for the search is a message for searching for an address in an external directory or searching for an address or a PCC in the same domain or a different domain.

The CAB server 110, upon receiving the search request message, retrieves a preset user search preference for optimizing a search from the CAB XDM server 120.

The CAB server 110 creates an external search request message for an external directory search associated with the search request message based on a search request preference included in the search preference. For example, "www.twitter.com" or "www.facebook.com" may be set as a preferred external search domain which is set by the user, and a preference level therefor may be set.

The CAB server 110 forwards the created external search request message to at least one external directories, and upon receiving an external response message including a search result from the external directories, translates the received external response message into a response message in an XML format.

The CAB server 110 applies a prioritized search preference to the translated response message by using the retrieved search preference. That is, the CAB server 110 removes a result which is not desired by the user by reflecting the preference to each element in the search result according to prioritization information of the search preference, thereby deriving a final result desired by the user.

The CAB server 110 forwards the derived final result to the CAB client 100 through the CAB network 200.

The CAB XDM server 120 stores search preferences corresponding to a plurality of clients.

As such, the present invention previously sets a search preference to search for address book information according to the set search preference, thereby providing an optimized search result to the user.

Figure 2:
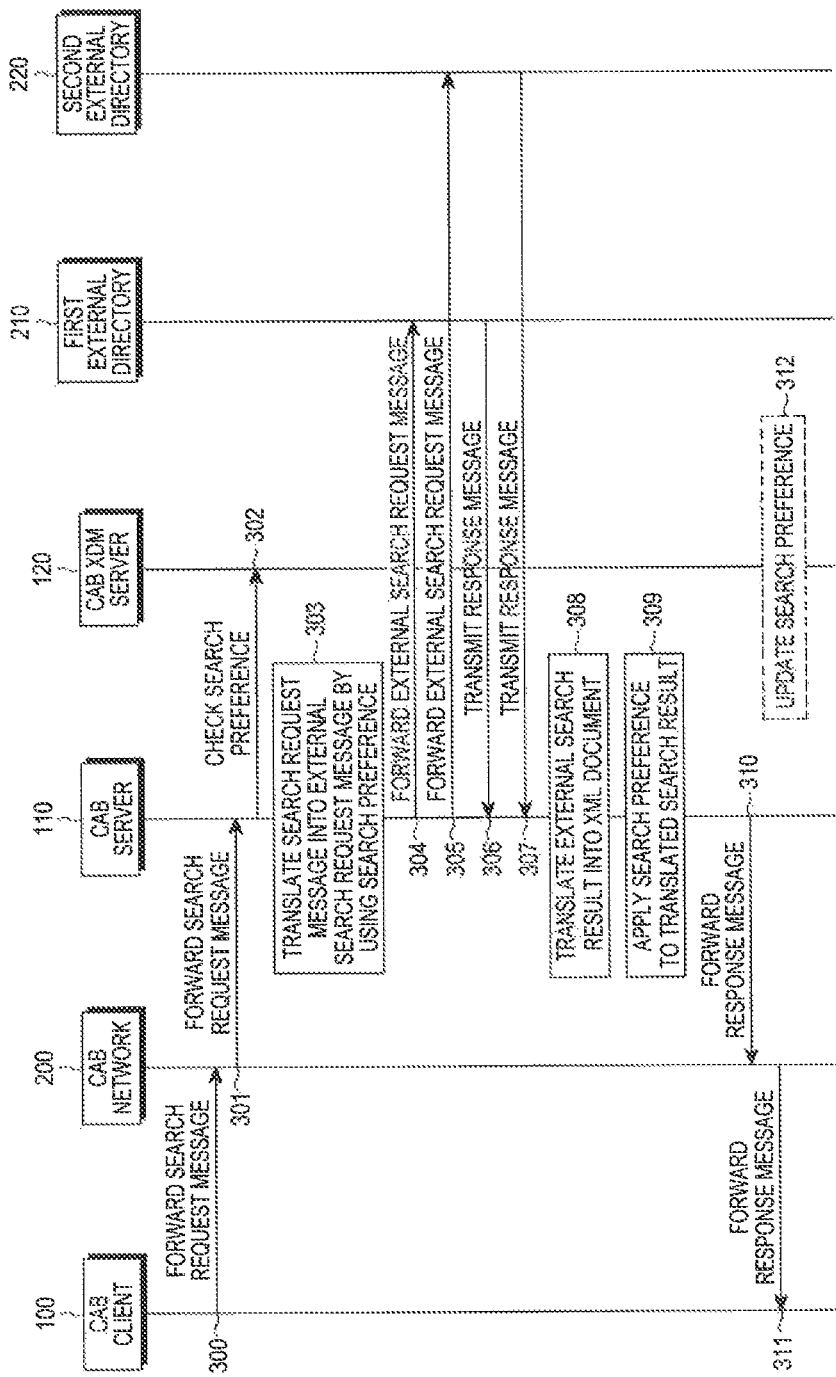
FIG. 2 is a flowchart illustrating a process of searching for address book information in an external directory in a CAB system according to an embodiment of the present invention.

FIG. 2 is a flowchart illustrating a process of searching for address book information in an external directory in a CAB system according to an embodiment of the present invention.

In an embodiment of the present invention, a contact search in an external directory will be described as an example.

In step 300, the CAB client 100 creates a search request message for a contact search in an external directory, and forwards the created search request message to the CAB network 200.

More specifically, the CAB client 100 specifies a new Application Usage ID (AUID) and a new target domain in a request-URI of the search request message, creates a contact search request message including an attribute <optimized_search> as an attribute of an element <search>, and forwards the created contact search request message to the CAB network 200.

<Table 2> shows an example of the contact search request message.

TABLE 2

```
POST /org.openmobilealliance.search?target=org.openmobilealliance.-
external-directories/global/&domain=global HTTP/1.1
Host: xcap.example.com
User-Agent: XDM-client/OMA2.0
Date: Thu, 10 Aug 2006 10:50:33 GMT
X-3GPP-Intended-Identity: "sip:joebloggs@example.com"
Accept-Encoding: gzip
Content-Type: application/vnd.oma.search+xml; charset="utf-8"
Content-Length: ...
<?xml version="1.0" encoding="UTF-8"?>
search-set    xmlns="urn:oma:xml:xdm:search">
<search id="1234" optimized-search="true">
    <request>
    <query>
        <![CDATA[
    xquery version "1.0";
    declare default element namespace "urn:oma:xml:xdm:external-
directories";
            for $u in collection("org.openmobilealliance.external-
directories/global/")/external-directories/external-directory
        where ($u/@display-name="michael jackson")
            return <contact> {$u/@uri}{$u/display-
name}{$u/language}{$u/country}{$u/region}</contact>
    ]]>
    </query>
    </request>
</search>
</search-set>
```

In step 301, the CAB network 200 recognizes that the contact search request message is an external directory search request through a corresponding entity in an XDM enabler, and forwards the contact search request message to an interworking function module 111 in the CAB server 110.

In step 302, the interworking function module 111 in the CAB server 110 recognizes that the attribute <optimized_search> in the contact search request message is true, and retrieves a search preference for search optimization from a CAB user preference app. usage 123 in the CAB XDM server 120.

In step 303, the interworking function module 111 translates the received search request message into an external search request message based on a search request preference included in the search preference. For example, the interworking function module 111 describes preference levels "1" and "5" for the user-set preferred external search domains www.twitter.com and www.facebook.com as shown in Table 2, respectively, and does not apply a user's location-based dynamic search. In this case, it is assumed that the preference level "1" is highest and the preference level "5" is lowest.

The interworking function module 111 forwards the external search request message to a first external directory 210 in step 304, and forwards the external search request message to a second external directory 220 in step 305.

In step 306, the interworking function module 111 receives a response message including an external search result from the first external directory 210.

<Table 3> shows an example of a search result with respect to the first external directory 210.

TABLE 3

```
<search id="abcd">
    <twitter_response>
        <user-profile uri=a@gmail.com>
        <display-name>michael jackson</display-name>
        <language>Korean</language>
        <country>KR</country>
        <region>Seoul</region>
        </user-profile>
        <user-profile uri=b@hotmail.com>
        <display-name>michael jackson</display-name>
        <language>Korean</language>
        <language>English</language>
        <country>UK</country>
        <region>London</region>
        </user-profile>
        <user-profile uri=c@msn.com>
        <display-name>michael jackson</display-name>
        <language>Korean</language>
        <country>KR</country>
        <region>Busan</region>
        </user-profile>
    </twitter_response>
</search>
```

In step 307, the interworking function module 111 receives a response message including an external search result from the second external directory 220.

<Table 4> shows an example of a search result with respect to the second external directory 220.

TABLE 4

```
<search id="efgh">
    <facebook_response>
        <user-profile uri=d@facebook.com>
        <display-name>michael jackson</display-name>
        <language>Chinese</language>
        <language>Korean</language>
        <country>CN</country>
        <region>Beijing</region>
        </user-profile>
        <user-profile uri=e@facebook.com>
        <display-name>michael jackson</display-name>
        <language>English</language>
        <country>UK</country>
        <region>London</region>
        </user-profile>
        <user-profile uri=f@facebook.com>
        <display-name>michael jackson</display-name>
        <language>Korean</language>
        <country>KR</country>
        <region>Seoul</region>
        </user-profile>
    </facebook_response>
</search>
```

In step 308, the interworking function module 111 aggregates the received external search results and translates the aggregated external search results into a standard XML search response document.

<Table 5> shows an example of the XML search response document translated from the aggregated external search results.

TABLE 5

```
<?xml version="1.0" encoding="UTF-8"?>
<search-set  xmlns="urn:oma:xml:xdm:search"
xmlns:et="urn:oma:xml:xdm:external-directories">>
    <search id="abcd">
        <twitter_response>
            <user-profile uri=a@gmail.com>
            <display-name>michael jackson</display-name>
            <language>Korean</language>
            <country>KR</country>
            <region>Seoul</region>
            </user-profile>
            <user-profile uri=b@hotmail.com>
            <display-name>michael jackson</display-name>
            <language>Korean</language>
            <country>UK</country>
            <region>London</region>
            </user-profile>
            </user-profile uri-c@msn.com>
            <display-name>michael jackson</display-name>
            <language>Korean</language>
            <country>KR</country>
            <region>Busan</region>
            </user-profle>
        </twitter_response>
    </search>
    <search id="efgh">
        <facebook_response>
            <user-profile uri=d@facebook.com>
            <display-name>michael jackson</display-name>
            <language>Chinese</language>
            <country>CN</country>
            <region>Beijing</region>
            </user-profile>
            <user-profile uri-e@facebook.com>
            <display-name>michael jackson</display-name>
            <language>English</language>
            <country>UK</country>
            <region>London</region>
            </user-profile>
            <user-profile uri=f@facebook.com>
            <display-name>michael jackson</display-name>
            <language>Korean</language>
            <country>KR</country>
            <region>Seoul</region>
            </user-profile>
        </facebook_response>
    </search>
```

As shown in Table 5, the interworking function module 111 may translate 6 search results having the matching attribute <display-name> from the first external directory 210 and the second external directory 220 into a standard XML search response document.

In step 309, the interworking function module 111 applies a prioritized search preference to the translated search response document by using the search preference.

<Table 6> shows an example of a result of applying the prioritized search preference to the search response document.

TABLE 6

```
<?xml version="1.0" encoding="UTF-8"?>
<search-set xmlns="urn:oma:xml:xdm:search" xmlns:et=
"urn:oma:xml:xdm:external-directories">
<search id="1234">
```

TABLE 6-continued

```
<response>
    <ed:external-directories uri="a@gmail.com"><ed:display-
name>michael jackson</ed:display-
name><ed:language>Korean</ed:language><ed:country>KR</ed:country>
<ed:region>Seoul</ed:region></ed:external-directories>
    <ed:external-directories uri="f@facebook.com"><ed:display-
name>michael jackson</ed:display-name><ed:language>Korean
</ed:language><ed:country>KR</ed:country><ed:region>Seoul
</ed:region></ed:external-directories>
    <ed:external-directories uri="c@msn.com"><ed:display-
name>michael jackson</ed:display-name><ed:language>Korean
</ed:language><ed:country>KR</ed:country><ed:region>Busan
</ed:region></ed:external-directories>
    <ed:external-directories uri="b@hotmail.com"><ed:display-
name>michael jackson</ed:display-name><ed:language>Korean
</ed:language><ed:country>UK</ed:country><ed:region>London
</ed:region></ed:external-directories>
    <ed:external-directories uri="e@gmail.com"><ed:display-
name>michael jackson</ed:display-name><ed:language>English
</ed:language><ed:country>UK</ed:country><ed:region>London
</ed:region></ed:external-directories>
    </response>
</search>
</search-set>
```

In Table 6, the element <language>, the element <country>, and the element <region> are reflected based on preference levels "1" and "10" according to the search prioritization element <prioritization matching>, and a result corresponding to <language>="Chinese" which is not desired by the user is removed from the search results, taking account of a filter in the user preference, such that 5 final search results are shown.

In step 310, the interworking function module 111 forwards the search response message to which search optimization is applied to an XDMS enabler of the CAB network 200.

In step 311, an entity in the XDMS enabler of the CAB network 200 forwards the search response message optimized for the user to the CAB client 100.

In step 312, the CAB XDM server 120 checks a status of an element <dynamic_search_preference_update> indicating whether a dynamic search preference of a server is updated in the search preference according to accumulated search requests and results, and updates a preset dynamic search preference based on rules in the server. Herein, the rules in the server used to update the dynamic search preference may be as follows:

A. A preference weight value of an external domain may be adjusted to some extent according to a final result of a preferred external search domain, such as the number of search results per domain associated with a search request, storage or non-storage of search results of the user, and so forth.

B. A prioritization weight value may be adjusted to some extent according to a final result of prioritization, such as the number of prioritized search results associated with a search response, storage or non-storage of search results of the user, and so forth.

C. The rules in the server may be extended according to necessary dynamic search preference update.

A process of applying dynamic search preference update to the search preference as in step 312 may be performed after the search preference is applied and the final search result is created as in step 309. Step 312 is an optional step which can be skipped.

As such, the present invention previously sets the user's search preference and searches for address book information according to the set search preference, thereby providing the search result optimized for the user.

Figure 3:
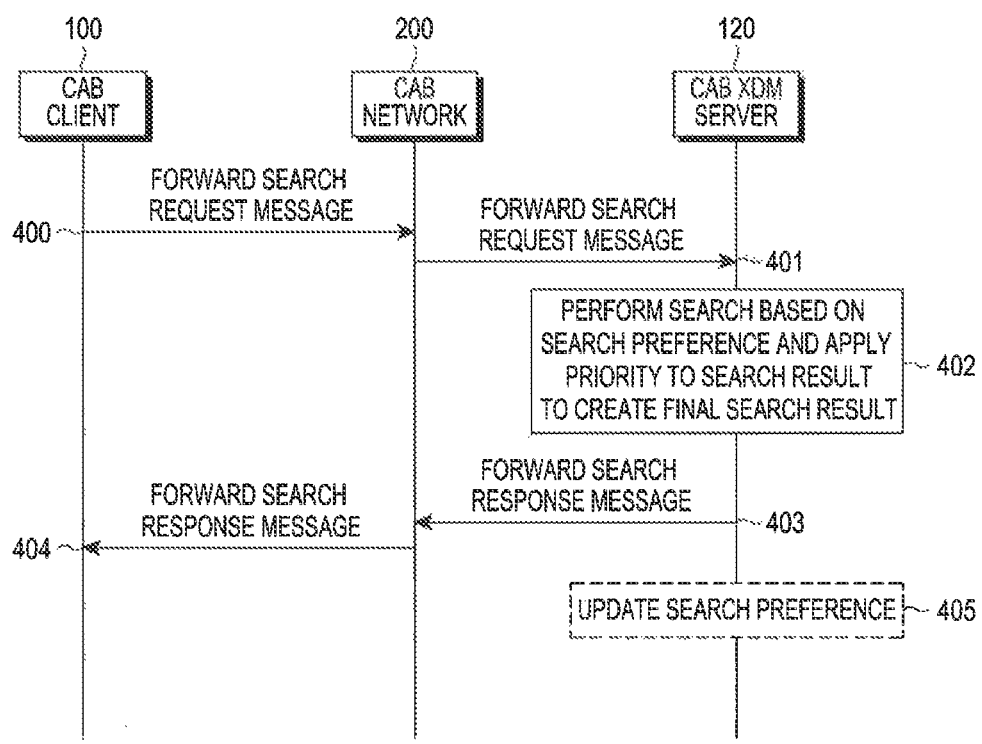
FIG. 3 is a flowchart illustrating a process of searching for address book information of the same domain or a different domain in a CAB system according to an embodiment of the present invention.

FIG. 3 is a flowchart illustrating a process of searching for address book information of the same domain or a different domain in a CAB system according to an embodiment of the present invention.

In an embodiment of the present invention, a process of searching for address book information of the same domain or a different domain will be described as an example, in which the address book information includes address information or PCC information.

In step 400, the CAB client 100 forwards the attribute <optimized_search> to the XDM enabler of the CAB network 200 through a contact search request message to search for address book information such as address information or a PCC of the same domain or a different domain.

In step 401, the CAB network 200 forwards the search request message to the CAB XDM server 120 through an entity in the XDM enabler.

In step 402, the CAB XDM server 120 checks if the received search request message includes the attribute <optimized_search>, searches a document associated with the address book information based on a preset search preference if the received search request message includes that attribute, and applies a prioritized search preference to the search result, thereby creating a final search result.

In step 403, the CAB XDM server 120 creates a contact search response message including the final search result and forwards the contact search response message to the XDM enabler.

In step 404, the entity in the XDM enabler forwards the received search response message to the CAB client 100.

In step 405, the CAB XDM server 120 checks a status of the element <dynamic_search_preference_update> indicating whether a dynamic search preference of a server is updated in the search preference according to accumulated search requests and results, and updates a preset dynamic search preference based on rules in the server. Herein, the rules in the server may be the same as those applied in step 312 of FIG. 2. Step 405 is an optional step which can be skipped.

The dynamic search preference update in step 405 of FIG. 3 may be performed after the CAB XDM server 120 applies the user search preference to the user's search request and the final search result is created as in step 402.

As such, the present invention previously sets the user's search preference and searches for address book information according to the set search preference, thereby providing the search result optimized for the user.

While a detailed embodiment of the present invention has been described, various modifications can be carried out without departing from the scope of the present invention. Therefore, the scope of the invention is not defined by the foregoing embodiment of the invention, but should be defined by claims and equivalents thereof.

Embodiments of the present invention can be implemented by hardware (for example, a computer), software, and a combination of the hardware and the software. For example, the software can be stored in volatile or non-volatile storage devices such as a ROM, memories such as a RAM, a memory chip, a device or an integrated circuit, and optically or magnetically recordable and machine-readable storage media such as a CD, a Digital Versatile Disc (DVD), a magnetic disk, a magnetic tape, etc., in rewritable or fixed formats. The CAB Server and the CAB XDM server can include a storage unit and a processor. The storage unit, which can be included in the servers, is an example of the machine-readable storage medium suitable for storing a program including instructions for implementation of the embodiments of the present invention. Therefore, embodiments of the present invention may include a program that includes a code for implementing the described systems and methods, and may further include machine-readable storage media for storing such a program. Further, the program can be electronically transferred by certain media such as a communication signal transmitted through a wired or wireless connection, and embodiments of the present invention further include various equivalents thereof.

The invention claimed is:

1. A method for searching for address book information by an apparatus, the method comprising:
   receiving a search request message for searching for address book information using preference information of a requesting client form the requesting client;
   in response to receiving the search request message, obtaining address information of a plurality of external directories and the preference information representing at least one external directory preferred by the requesting client from an external server;
   checking address information of at least one external directory form among the address information of the plurality of external directories based on the preference information and the address information;
   forwarding an external search request message to the at least one external directory using the address information of the at least one external directory;
   receiving an external search response message including an external search result searched by the at least one external directory from the at least one external directory;
   prioritizing the external search result and arranging the prioritized external search result; and
   forwarding a final search result including at least part of the arranged external search result to the requesting client,
   wherein the preference information further comprises information regarding application or non-application of a search preference to the search request of the address book information, information regarding application or non-application of the search preference to at least one external search domain corresponding to the at least one external directory, and information regarding application or non-application of the search preference for a dynamic search according to a user's location, and
   wherein the information regarding application or non-application of the search preference to the at least one external search domain comprises the at least one external search domain and a preference weight value per domain.

2. The method of claim 1, wherein the search request message comprises an Application Usage ID (AUID).

3. The method of claim 1, wherein the information regarding application or non-application of the search preference for the dynamic search according to the user's location comprises location information and time-zone information of the user.

4. The method of claim 1, wherein the preference information further comprises information regarding application or non-application of a search preference to the external search result, information regarding application or non-application of prioritized preference to the external search result, and filter information for filtering the external search result.

5. The method of claim 4, wherein the information regarding application or non-application of a prioritized preference to the external search result comprises preference for prioritization of the external search result and a weight value for the search preference.

6. The method of claim 1, wherein external search request message comprises a preference weight value corresponding to the at least one external search domain and a preference level for the at least one external search domain.

7. The method of claim 4, further comprising:
   filtering the arranged external search result using a prioritized preference; and
   forwarding the final search result including the filtered external search result to the requesting client.

8. An article of manufacture for searching for address book information, comprising a non-transitory machine readable medium containing one or more programs which when executed implement the steps of:
   receiving a search request message for searching for address book information using preference information of a requesting client form the requesting client;
   in response to receiving the search request message, obtaining address information of a plurality of external directories and the preference information representing at least one external directory preferred by the requesting client from an external server;
   checking address information of at least one external directory form among the address information of the plurality of external directories based on the preference information and the address information;
   forwarding an external search request message to the at least one external directory using the address information of the at least one external directory;
   receiving an external search response message including an external search result searched by the at least one external directory from the at least one external directory;
   prioritizing the external search result and arranging the prioritized external search result; and
   forwarding a final search result including at least part of the arranged external search result to the requesting client,
   wherein the preference information further comprises information regarding application or non-application of a search preference to the search request of the address book information, information regarding application or non-application of the search preference to at least one external search domain corresponding to the at least one external directory, and information regarding application or non-application of the search preference for a dynamic search according to a user's location, and
   wherein the information regarding application or non-application of the search preference to the at least one external search domain comprises the at least one external search domain and a preference weight value per domain.

9. An apparatus for searching address book information, the apparatus comprising:
   A database for storing a search preference corresponding to a requesting client; and
   A server configured to:
      receive a search request message for searching for address book information using preference information of a requesting client form the requesting client;
      in response to receiving the search request message, obtaining address information of a plurality of external directories and the preference information representing at least one external directory preferred by the requesting client from an external server;

check address information of at least one external directory form among the address information of the plurality of external directories based on the preference information and the address information;

forward an external search request message to the at least one external directory using the address information of the at least one external directory;

receive an external search response message including an external search result searched by the at least one external directory from the at least one external directory;

prioritize the external search result and arranging the prioritized external search result; and forward a final search result including at least part of the arranged external search result to the requesting client, wherein the preference information further comprises information regarding application or non-application of a search preference to the search request of the address book information, information regarding application or non-application of the search preference to at least one external search domain corresponding to the at least one external directory, and information regarding application or non-application of the search preference for a dynamic search according to a user's location, and wherein the information regarding application or non-application of the search preference to the at least one external search domain comprises the at least one external search domain and a preference weight value per domain.

10. The apparatus of claim 9, wherein the database is implemented in the server.

11. The apparatus of claim 9, wherein the database further stores search priority information for the search preference corresponding to the requesting client.

12. The apparatus of claim 9, wherein the search request message comprises an Application Usage ID (AUID).

13. The apparatus of claim 9, wherein the information regarding application or non-application of the search preference for the dynamic search according to the user's location comprises location information and time-zone information of the user.

14. The apparatus of claim 9, wherein the preference information further comprises information regarding application or non-application of the search preference to the external search result, information regarding application or non-application of a prioritized preference to the external search result, and filter information for filtering the external search result.

15. The apparatus of claim 13, wherein the information regarding application or non-application of the search preference to the external search result comprises a preference for prioritization of the external search result and a weight value for the search preference.

16. The apparatus of claim 12, wherein the server is further configured to:
reflect a preference weight value to the at least one external search domain, and
set a preference level for the at least one external search domain according to a reflection result.

17. The apparatus of claim 13, wherein the server is further configured to:
filter the arranged external search result using a prioritized preference, and
forward the final search result including the filtered external search result to the requesting client.

18. The method of claim 1, further comprising updating the preference information based on the external search result if a dynamic search preference of the search preference is set.

19. The method of claim 18, wherein the updating of the preference information comprises:
based on the external search result, adjusting a preference weight value for at least one external search domain corresponding to the at least one external directory.

20. The method of claim 18, wherein the updating of the preference information comprises:
based on a priority reflection result with respect to a user preference according to a search response, adjusting a reflection weight value for priority reflection.

21. The apparatus of claim 9, wherein the database is further configured to update the preference information based on the external search result if a dynamic search preference of the search preference is set.

22. The apparatus of claim 21, wherein the database is further configured to, based on the external search result, adjust a preference weight value for the at least external search domain corresponding to the at least one external directory.

23. The apparatus of claim 21, wherein the database is further configured to, based on a priority reflection result with respect to a user preference according to a search response, adjust a reflection weight value for priority reflection.

24. The method of claim 4, wherein the filter information includes a uniform resource identifier (URI), a display name, a language, a country and a region.

25. The apparatus of claim 14, wherein the filter information includes a uniform resource identifier (URI), a display name, a language, a country and a region.

* * * * *